Sept. 14, 1965    R. R. LOVE    3,206,222
TANDEM AXLE FOR TRAILER
Filed Sept. 20, 1963    2 Sheets-Sheet 1

INVENTOR.
RICHARD R. LOVE

BY

ATTORNEYS.

Sept. 14, 1965  R. R. LOVE  3,206,222
TANDEM AXLE FOR TRAILER
Filed Sept. 20, 1963  2 Sheets-Sheet 2

INVENTOR.
RICHARD R. LOVE
BY
ATTORNEYS.

United States Patent Office 3,206,222
Patented Sept. 14, 1965

3,206,222
TANDEM AXLE FOR TRAILER
Richard R. Love, Buhl, Idaho
Filed Sept. 20, 1963, Ser. No. 310,219
3 Claims. (Cl. 280—81)

This invention relates generally to axles for use in trucks, trailers, and the like and, more particularly, to tandem axles having a capability of independent oscillation with respect to one another.

For many years, tandem axles have been used on trucks, trailers, and the like to increase the number of wheels and thus provide a wider distribution of the load upon the road surface. In tandem axle structures, however, certain difficulties are encountered. Unless some independence of motion between the axles is provided for, irregularities in the road surface will cause a simultaneous oscillating movement of both axles resulting in increased transmission of shocks, jars and the like to the vehicle structure and imposing greater stresses and strains in the axle system itself. Generally speaking, tandem axles in the prior art have been rigidly connected together thereby obviating independence of motion between the axles, or have incorporated rather complicated structures to allow independence of motion to avoid the disadvantage of a unitary system.

This invention provides a new and improved tandem axle linkage system which, although furnishing rigid support between the axles where required, allows independent vertical motion at the end of each axle. This linkage system is achieved by connecting the respective ends of the axles with cross members to form an essentially rectangular structure. The cross members are each rigidly connected to opposite axles at one end thereof and hingedly connected to the opposing axle at the other end thereof. The hinge connections are disposed to provide a hinge or folding line for the total structure which coincides with a diagonal line between the hinged corners of the rectangle described by the structure. This hinge, or folding line in the axle linkage allows vertical movement of any single corner of the structure independently of the remaining corners thereof.

It is an object of this invention to provide a tandem axle structure having independently oscillating axles to avoid the above-stated difficulties.

It is another object of this invention to provide a new and improved linkage between tandem axles to allow independent oscillation thereof.

It is still another object of this invention to provide a linkage between independently oscillating axles of a tandem axle unit which is simple, economical and durable.

It is a further object of this invention to provide a linkage between independently oscillating axles of a tandem axle system in which a mimimum number of members and pivots are required.

It is yet another object of this invention to provide a tandem axle system in which stress in the system due to the independent oscillation of the axles is substantially eliminated.

It is still a further object of this invention to provide a tandem axle unit in which side motion transmitted to the vehicle through oscillation of the axles thereof is substantially eliminated.

It is yet a further object of this invention to provide a tandem axle system incorporating energy absorbing devices which are equally effective under either empty or loaded conditions and, in both conditions, avoid vehicle top sway.

These and other objects of the invention will be more apparent to those skilled in the art by reference to the following detailed description, when viewed in light of the accompanying drawings in which like figures represent like parts thereof and wherein.

Figure 1:
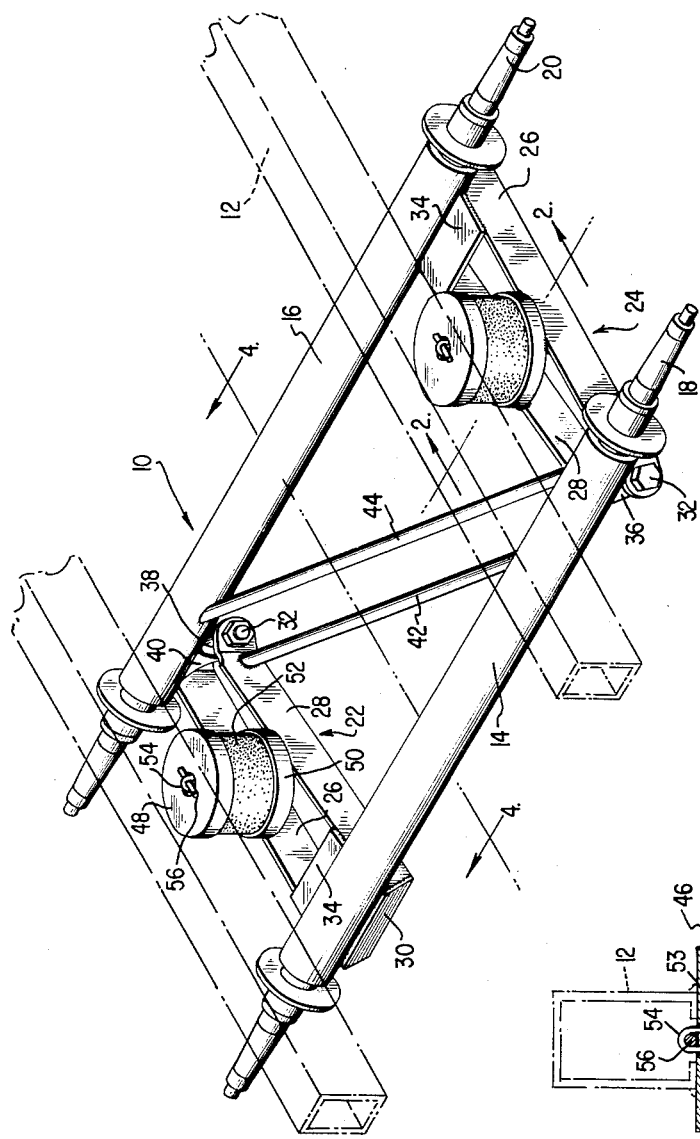
FIGURE 1 is a perspective view of a device embodying the present invention.
Figure 3:
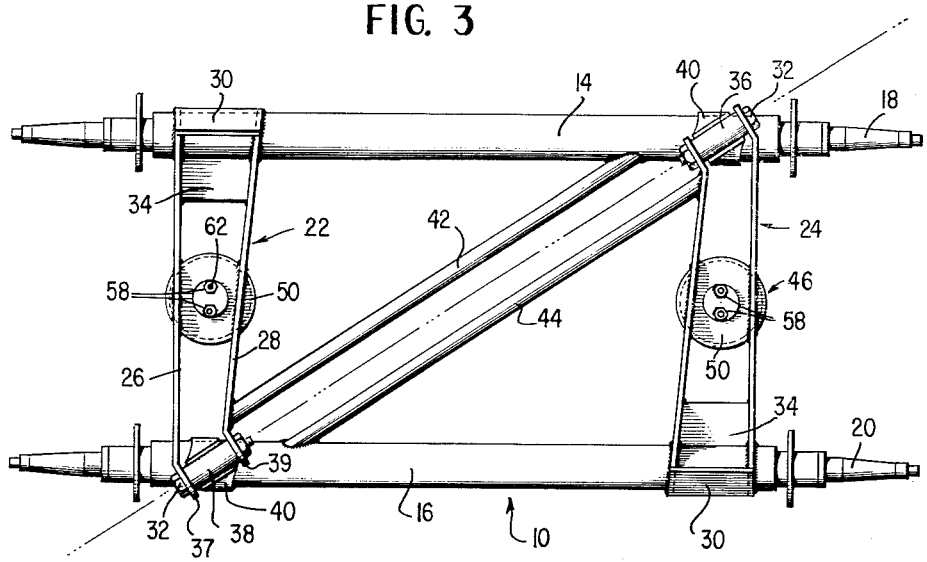
FIGURE 3 is a bottom plan view of the device of FIGURE 1.

Referring now more particularly to FIGURE 1 of the drawings, the tandem axle unit, indicated generally at 10, is secured to the frame members 12 of a vehicle. The axle unit consists of the parallel spaced axle housings 14 and 16 with the axles 18 and 20 rotationally disposed therein. The respective ends of the axle housings are connected by cross members 22 and 24 which consists of a pair of metal plate members 26 and 28 arranged in spaced parallel relation to one another. The plates 26 and 28 are secured together at one end thereof by an end plate 30, FIGURE 3, and at the other end thereof by a hinge bolt 32. A top plate 34 is disposed across the upper surfaces of the longitudinal plates 26 and 28 as shown. The plates are connected together, in this embodiment, by welding or other suitable means. The cross members 22 and 24 are similarly connected to the axle housings 14 and 16 at their outer end portions by welding or any other suitable means.

The axle housing 14 is provided at one end thereof with a hinge bearing 36, while axle housing 16 has mounted thereon a hinge bearing 38 that is diametrically disposed with respect to hinge bearing 36. The hinge bearings are connected to the axle housings by straps 40 welded thereto. The longitudinal plates 26 and 28 terminate at their free ends in angularly offset segments or portions 37 and 39, respectively, which are positioned at opposite ends of the hinge bearings 36 and 38, FIGURE 3. The offset segments or portions 37 and 39 are formed with apertures through which the hinge bolt 32 extends so as to form hinge connections between cross members 22 and 24, and axle housings 14 and 16 respectively. The longitudinal plate 28 of cross member 22 has secured thereto, adjacent the hinge bearing 38, one end of a bar 42 with the other end of said bar being affixed to the housing 14 adjacent the hinge bearing 36. The longitudinal plate 28 of the cross member 24 has one end of a bar 44 secured thereto adjacent the hinge bearing 36 with the other end of said bar being affixed to the housing 16 adjacent the hinge bearing 38. These bars are disposed in spaced parallel relation to one another and are arranged diagonally of the axle unit and while said bars are not necessary to the operation of the linkage, may be incorporated to provide additional planar rigidity of the structure. Planar rigidity is initially maintained by the hinges, however, the diagonal bars serve as additional resistance to planar deformation and thus tend to avoid wear of the hinge structures.

Figure 2:
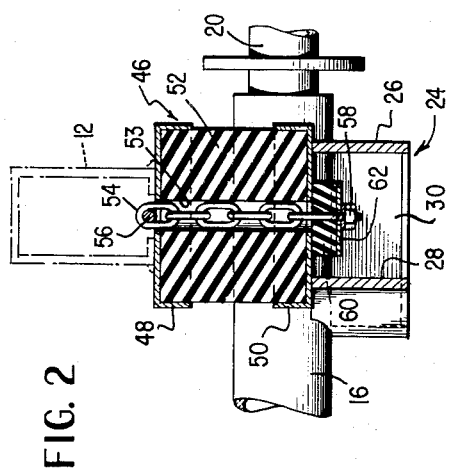
FIGURE 2 is an enlarged sectional view of a detailed portion of the device taken along the lines 2—2 of FIGURE 1.
Figure 4:
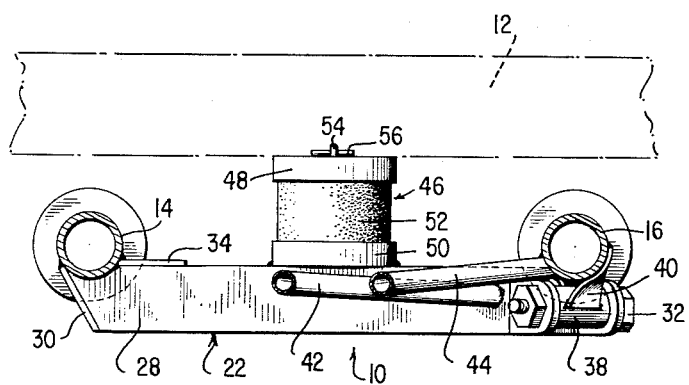
FIGURE 4 is a sectional side view of the device of FIGURE 1, the view being taken on a plane indicated by the lines 4—4.

The shock absorbing device 46 shown in FIGURES 2 and 4 comprise an upper and lower cup 48 and 50, respectively, which are configured to receive an annular elastomeric member 52 that is formed with a central bore or passage 53 through which a retaining chain 54 extends. The chain also extends through a centrally located aperture in cups 48 and 50 and is anchored at cup 48 by a cross pin 56. The lower end of the chain is provided with a U bolt 58 that projects through the aperture in cup 48 and through a cushioning or dampening member 60 and a bottom plate 62.

The elastomeric member 52, in conjunction with cups 48 and 50 constitutes a shock absorbing mounting between the vehicle frame 12 and the axle structure 10; and at the same time, acts or functions as a compensation means for relative angular deflection between said frame and axle. The chain 54, with accompanying structure, provides a tension connection between the members to avoid separation thereof upon the relaxation of the elastomeric member after compression thereof. The cushioning or dampening member 60 absorbs shocks which are attendant with sudden "bouncing" returns of the elastomeric member 52 after the compression stroke thereon. The elastomeric members may be formed of any suitable material such as natural or synthetic rubbers. The metallic components of the elastomeric device are preferably fabricated from alloy steels. A particular advantage afforded by the connection shown is the ease of replacement of the elastomeric member 52 by a simple step of disconnecting the axle system from the frame through removal of the chain 54. This specific method of construction described is, of course, merely exemplary and other suitable methods of connection such, for example, as the use of cables or the like in place of the chain would obviously be within the scope of the invention.

The axle structure, being secured to a vehicle in the manner as set forth above, describes a rectangular parallelogram mounted in a pivotal manner at the center of its shorter sides through the shock absorbing devices 46. The parallelogram is also, through its hinged connections, foldable about the broken diagonal line of FIGURE 3. This hingeability of the structure provides a rigid rectangle in the plane of the parallelogram and rigid non-turning connections between the frame and the axle housings to resist braking and driving torque imposed thereon, yet allows relative vertical movement between any of the axle spindles. Movement of an axle spindle either up or down will, of course, cause angular deflection of the adjacent cross member with respect to the vehicle frame. This displacement is compensated for by deflection of one of the shock absorbing devices 46 which acts as a central pivot for the oscillating members.

A particular benefit is realized through the utilization of the elastomeric shock absorbing members 52 over a conventional spring mounted vehicle in that the springs must be strong enough to support the vehicle in a loaded condition; but when empty, the springs are too stiff to absorb road shock. Furthermore, the use of springs tends to aggravate a top condition in a vehicle when fully loaded while in the use of an axle structure of the present invention in conjunction with rubber mounts, these difficulties are avoided or materially reduced. In addition, the rubber mounts tend to absorb any side motion that might be imparted to the vehicle due to vertical movement of the axles, thus provides a vehicle having a more stable load carrying capability. It has been found that loads carried on structure embodying this invention in general require minimum tie down as compared to loads carried on vehicles having a conventional axle system.

The specific details of the structure disclosed above are presented merely as exemplary of structures embodying the invention and may be varied to some extent within the scope of the invention. For example, cross members 22 and 24, although shown fabricated from welded plates, may obviously be fabricated by casting as an integral part by riveting or by forging. As was pointed out in the description of shock absorbing device 46, the materials used in the fabrication are to a large extent, a matter of choice, however, for cost, durability, and strength the structural metallic elements are preferably alloy steel or material having similar properties. Hinge bearings 36 and 38 are preferably conventional bronze bearings or similar material which will provide durable, friction-free oscillation of the members.

Although the specific embodiment shown above discloses the use of two dolly axles tied in tandem relationship, the structure, obviously, may be incorporated in other types of axles.

Figure 5:
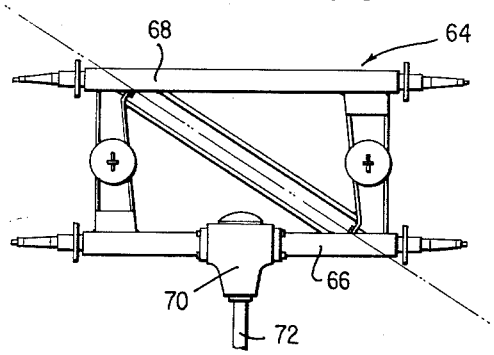
FIGURE 5 is a reduced top plan view of another device incorporating the features of the present invention.

Referring to FIGURE 5, the invention is shown embodied in tandem axle shown generally at 64. The axle comprises live axle 66 and dolly axle 68. Live axle 66 is connected in a conventional manner through differential 70 to drive shaft 72. Other than the incorporation of live axle 66, the structure for the axle linkage in connection to vehicle frame is identical to that described for the aforementioned figures. Oscillation of the respective spindles of the axle occurs around the diagonal broken line of FIGURE 5.

Of course, many other modifications can obviously be made in the light of the above teachings. What is set forth is intended to be exemplary to enable those skilled in the art to practice the invention and is not intended to be a limitation on the practice thereof. It is therefore to be understood that, within the scope of the appended claims, the invention may be practiced otherwise than as specifically described.

I claim:

1. In an independently oscillating tandem axle structure for vehicles:

a pair of axle housings disposed in spaced parallel relationship to one another, said housings having axles rotationally disposed therethrough, a first tubular hinge bearing angularly disposed on the end of one of said axles, a second tubular hinge bearing angularly disposed on the opposite end of the other of said axles, said bearings further being disposed in axial alignment with one another;

cross members linking the respective ends of said axle housings, said cross members comprising a pair of spaced elongated plates, cross plates disposed between and connecting the ends of said longtiudinal plates at one end thereof, said one end further being rigidly connected to the ends of said housings opposite said bearings, the other ends of said longitudinal plates having angularly aligned apertures therethrough, said apertures being coaxially disposed with respect to said bearings, and a hinge bolt disposed through said apertures and said bearing to hingedly connect said cross member to said housing;

a shock absorbing connecting member disposed on the midportion of said cross member, said shock absorbing unit comprising upper and lower retaining cups disposed in opposite facing relatonship, said cups having holes coaxialy disposed therethrough, a cylindrical elastomeric member disposed between said cups, said elastomeric member having a bore coaxially disposed therethrough, a chain substantially equal in length to said elastomeric unit disposed through said bore and said holes, means to removably connect said chain to said upper cup, a second cylindrical elastomeric member coaxially disposed beneath said lower cup, a circular plate disposed in abutting relationship beneath said secondary elastomeric member, and a connecting means between said chain and said plate, said lower cup being rigidly connected at the base thereof to said cross member and said upper cup being connectable to a vehicle frame member;

whereby vertical deflection of one of the ends of one of said axles will deflect the end of the corresponding housing and cross member about a line between said hinge members without transmitting corresponding deflection to the remaining ends of said axles.

2. An axle structure in accordance with claim 1 wherein a diagonal cross brace is disposed between said axle housing adjacent said bearing and the hinged end of the cross member rigidly attached thereto respectively.

3. In an independently oscillating tandem axle for vehicles:
  a first and second axle housing disposed in spaced coextensive parallel relationship to one another, a first tubular hinge bearing angularly disposed on one end of said first axle, a second tubular hinge bearing angularly disposed on the end of said second axle adjacent the end of said first axle opposite said one end, said bearings being disposed in coaxial alignment with one another;
  a pair of rigid cross member beams linking the respective adjacent ends of said housings to form in conjunction therewith a rectangular structure, said beams being rigidly connected to the ends of said housing opposite said bearings, the other ends of said beams being mounted to said bearings for hinged connection to the bearing end of said housing, whereby vertical deflection of an end of said housing opposite a bearing will deflect that end about an arc around a line between said hinge members without transmitting corresponding deflection to the remaining ends of said axles while vertical deflection of an end of said housing having one of said bearings thereon will deflect that end about an arc tangent to a line between said hinge members without transmitting corresponding deflection to the remaining ends of said housings;
  a connecting member disposed on the mid portion of said beams for mounting the tandem axle structure to a vehicle, said connecting member having pivotal means associated therewith to provide vertical oscillatory movement of the ends of said beam with respect to the vehicle.

References Cited by the Examiner
UNITED STATES PATENTS

| | | | |
|---|---|---|---|
| 1,860,470 | 5/32 | Marcum | 280—104.5 |
| 3,017,195 | 1/62 | Hickman | 280—104.5 |

MILTON BUCHLER, *Primary Examiner.*

A. HARRY LEVY, *Examiner.*